US009659446B2

(12) United States Patent
Janosov et al.

(10) Patent No.: US 9,659,446 B2
(45) Date of Patent: May 23, 2017

(54) REAL MONEY GAMBLING PAYOUTS THAT DEPEND ON ONLINE SOCIAL ACTIVITY

(71) Applicant: Zynga Inc., San Francisco, CA (US)

(72) Inventors: Jesse Janosov, San Francisco, CA (US); Nir Leibovich, Austin, TX (US)

(73) Assignee: Zynga Inc., San Francisco, CA (US)

( * ) Notice: Subject to any disclaimer, the term of this patent is extended or adjusted under 35 U.S.C. 154(b) by 117 days.

(21) Appl. No.: 14/210,358

(22) Filed: Mar. 13, 2014

(65) Prior Publication Data

US 2014/0274341 A1 Sep. 18, 2014

Related U.S. Application Data

(60) Provisional application No. 61/786,552, filed on Mar. 15, 2013.

(51) Int. Cl.

| | |
|---|---|
| ***G06F 17/00*** | (2006.01) |
| ***G07F 17/32*** | (2006.01) |
| ***G06Q 50/00*** | (2012.01) |
| ***G06Q 50/34*** | (2012.01) |

(52) U.S. Cl.
CPC ......... *G07F 17/3244* (2013.01); *G06Q 50/01* (2013.01); *G06Q 50/34* (2013.01); *G07F 17/3218* (2013.01); *G07F 17/3223* (2013.01); *G07F 17/3225* (2013.01); *G07F 17/3293* (2013.01)

(58) Field of Classification Search
CPC ............. G07F 17/3244; G07F 17/3293; G07F 17/3218; G07F 17/3225; G07F 17/3223; G06Q 50/34; G06Q 50/01
See application file for complete search history.

(56) References Cited

U.S. PATENT DOCUMENTS

| | | | | |
|---|---|---|---|---|
| 5,755,621 | A | 5/1998 | Marks et al. | 463/42 |
| 5,833,540 | A | 11/1998 | Miodunski et al. | 463/42 |
| 5,971,849 | A | 10/1999 | Falciglia | 463/16 |
| 6,039,648 | A | 3/2000 | Guinn et al. | 463/16 |
| 6,077,162 | A | 6/2000 | Weiss | 463/26 |
| 6,450,500 | B1 | 9/2002 | Miller | 273/292 |
| 7,066,465 | B2 | 6/2006 | Daines | 273/292 |
| 7,255,351 | B2 | 8/2007 | Yoseloff et al. | 273/274 |
| 8,459,650 | B2 | 6/2013 | Baseel | 273/292 |
| 8,727,850 | B2 | 5/2014 | Burnside et al. | 463/13 |
| 8,997,117 | B1 * | 3/2015 | Ranjan | G06F 17/30345 719/318 |
| 2002/0045474 | A1 | 4/2002 | Singer et al. | 463/20 |
| 2003/0222400 | A1 | 12/2003 | Collins et al. | 273/274 |

(Continued)

*Primary Examiner* — Dmitry Suhol
*Assistant Examiner* — Carl V Larsen
(74) *Attorney, Agent, or Firm* — Martine Penilla Group, LLP

(57) ABSTRACT

Software on a server and/or client device causes a view in a graphical user interface (GUI) for a game to be displayed to a user. The game is an online gambling game for real money. The software receives input from the user. The input includes a wager and play according to game mechanics for the game. The software calculates a payout from the play. The payout includes a promotional payout that depends at least in part on a measure of social activity associated with the user or a measure of social influence associated with the user. And the software broadcasts the payout to at least one other person who is a social relation of the user.

18 Claims, 16 Drawing Sheets

(56) References Cited

U.S. PATENT DOCUMENTS

| | | | | |
|---|---|---|---|---|
| 2005/0054446 | A1 | 3/2005 | Kammier et al. | 463/42 |
| 2005/0253338 | A1 | 11/2005 | Daines | 273/292 |
| 2007/0121843 | A1* | 5/2007 | Atazky | H04L 12/588 379/114.13 |
| 2010/0145771 | A1* | 6/2010 | Fligler | G06Q 10/10 705/319 |
| 2010/0203963 | A1* | 8/2010 | Allen | G07F 17/32 463/30 |
| 2010/0216509 | A1* | 8/2010 | Riemer | H04M 1/72577 455/557 |
| 2011/0184792 | A1* | 7/2011 | Butcher | G06Q 10/10 705/14.13 |
| 2012/0074647 | A1 | 3/2012 | Hall | 273/274 |
| 2012/0083334 | A1* | 4/2012 | Johnson | G07F 17/32 463/31 |
| 2012/0202587 | A1* | 8/2012 | Allen | G07F 17/3223 463/25 |
| 2013/0006709 | A1* | 1/2013 | Kosta | G07F 9/023 705/7.29 |
| 2013/0165210 | A1* | 6/2013 | Nelson | G07F 17/3225 463/25 |
| 2013/0198609 | A1* | 8/2013 | Mokhtarzada | G06F 3/048 715/234 |
| 2014/0019264 | A1* | 1/2014 | Wachman | G06Q 30/0276 705/14.72 |
| 2014/0089067 | A1* | 3/2014 | Filev | G06Q 30/0207 705/14.19 |
| 2014/0094241 | A1* | 4/2014 | Guinn | G07F 17/3255 463/16 |
| 2014/0114770 | A1* | 4/2014 | Rao | G06Q 50/01 705/14.66 |
| 2014/0214510 | A1* | 7/2014 | Karri | G06Q 50/01 705/14.19 |

* cited by examiner

Figure 4A
401
402
403
404
JACKPOT
1,500
255
10
TOTAL BET
10
LAST WIN
90
LINES
10
BET
1
MAX LINES
SPIN

Figure 4B
401
405
TERRIFIC!
SPIN
Play Zynga slots on the
Retina display iPad!

Figure 5A
JACKS OR BETTER
Hold
Hold
Hold
Hold
Hold
DEAL
$100
$200
$300
$400
$500

502

504

503

501

801

801

REAL MONEY GAMBLING PAYOUTS THAT DEPEND ON ONLINE SOCIAL ACTIVITY

RELATED APPLICATIONS

This application claims priority to U.S. Provisional Application No. 61/786,552, also entitled "Real Money Gambling Payouts That Depend on Online Social Activity", filed on Mar. 15, 2013, and hereby incorporates by reference the disclosure of that application.

BACKGROUND

Though online gambling for real money allows a user to gamble conveniently from almost any location, it lacks the social dimension that results from being in the company of other gamblers at the slots or poker tables of a busy casino.

Consequently, websites that provide online gambling for real money are engaged in ongoing research and study into ways to make online gambling more social.

SUMMARY

In an example embodiment, a processor-executed method is described. According to the method, software on a server and/or client device causes a view in a graphical user interface (GUI) for a game to be displayed to a user. The game is an online gambling game for real money. The software receives input from the user. The input includes a wager and play according to the game mechanics for the game. The software calculates a payout from the play. The payout includes a promotional payout that depends at least in part on a measure of social activity associated with the user or a measure of social influence associated with the user. And the software broadcasts the payout to at least one other person who is a social relation of the user.

In another example embodiment, an apparatus is described, namely, computer-readable storage media that persistently store a program. The program might be part of the software runs on a server and/or client device. The program causes a GUI view for a game to be displayed to a user. The game is an online gambling game for real money. The program receives input from the user. The input includes a wager and play according to the game mechanics for the game. The program calculates a payout from the play. The payout includes a promotional payout that depends at least in part on a measure of social activity associated with the user or a measure of social influence associated with the user. And the program broadcasts the payout to at least one other person who is a social relation of the user.

Another example embodiment also involves a processor-executed method. According to the method, software on a server and/or client device causes a view in a graphical user interface (GUI) for a game to be displayed to a user. The game is a video slot machine and the view includes a reel symbol that includes text suggesting that the user invite other persons to play the game. The software receives input from the user identifying one or more other persons to be invited to the play the game. Then the software changes the reel symbol with the text to another reel symbol that compensates the user.

Other aspects and advantages of the inventions will become apparent from the following detailed description, taken in conjunction with the accompanying drawings, which illustrate by way of example the principles of the inventions.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
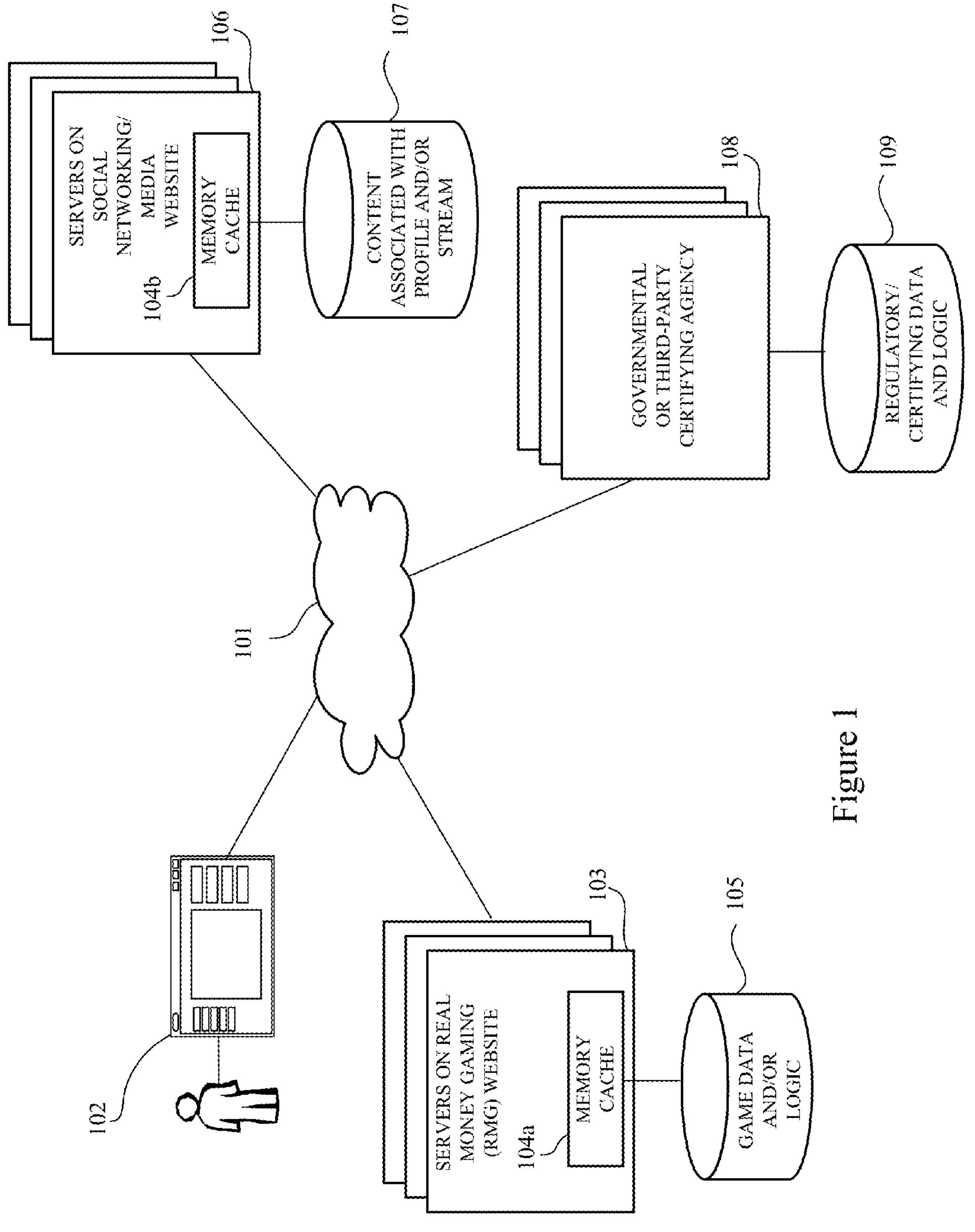
FIG. 1 is a network diagram that illustrates a network for an online game involving real-money gambling (RMG), in accordance with an example embodiment.

FIG. 1 is a network diagram that illustrates a network for an online game involving real-money gambling (RMG), in accordance with an example embodiment. As depicted in this figure, a personal computing device 102 is connected by a network 101 (e.g., a wide area network (WAN) including the Internet, which might be wireless in part or in whole) with a website 103 hosting a real-money gambling game (e.g., a website such as Zynga hosting a video slot machine or other casino game) and a website 106 hosting a social network (e.g., a website such as Facebook) and/or social media (e.g., a website such as MySpace). As used here and elsewhere in this disclosure, the term "social networking/media website" is to be broadly interpreted to include, for example, any website that allows its users to, among other things, (a) selectively access (e.g., according to a contact list, buddy list, social graph, or other access control list (ACL)) content in each other's profiles; (b) selectively (e.g., according to a contact list, buddy list, social graph, distribution list, or other ACL) broadcast content to each other's content/activity streams; and/or (3) selectively communicate (e.g., according to a contact list, buddy list, social graph, distribution list, or other ACL) with each other (e.g., using a messaging protocol such as email, instant messaging, short message service (SMS), etc.). As also depicted in FIG. 1, website 103 might also be connected by network 101 (e.g., through a secure application programming interface (API)) to a website 108 controlled and maintained by a governmental agency (e.g., the Nevada Gaming Control Board, the New Jersey Casino Control Commission, or the Isle of Man Gambling Supervision Commission (IMGSC)) or a third-party certifying agency (e.g., an accounting firm such as one of the "Big Four" auditing firms or a consulting firm such as Cigital, Ltd.), which might use network 101 to conduct or facilitate an audit of website 103 (e.g., test and certify the website's random number generator (RNG) against the "Online Gambling (Systems Verification)(No. 2) Regulations 2007" promulgated by the IMGSC). In an alternative embodiment, website 103 might be connected by a dedicated network connection to website 108. The illustrated auditing parties are only examples, and other auditing commissions, agencies, or entities might conduct or facilitate auditing of website 103, e.g., in cooperation with government agencies. In example embodiments, website 103 might execute software (e.g., client software) that facilitates real-time (or near real-time) reporting to or auditing by website 108.

Figure 2A:
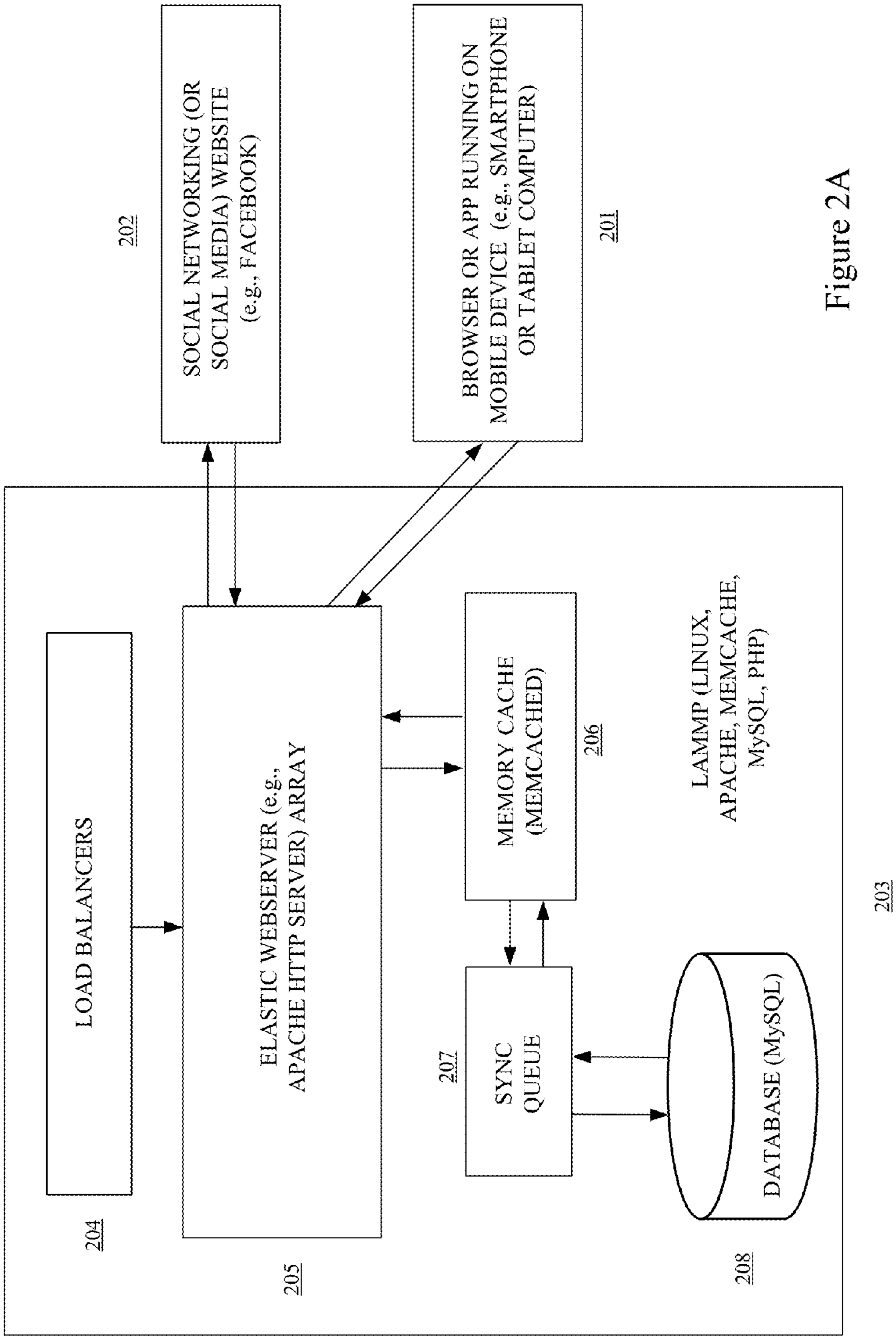
FIG. 2A is a software modularization for a cloud platform, in accordance with an example embodiment.

FIG. 2A is a software modularization for a cloud platform, in accordance with an example embodiment. As depicted in this figure, a player is using a web browser or app 201 on a mobile device (e.g., a smartphone or a tablet computer) to interact with (e.g., transmit or receive game data) server software 203 running on a website hosting an online RMG game (e.g., running on the servers at website 103 in FIG. 1). It will be appreciated that an application program for a mobile device is often referred to as an "app". In an example embodiment, server software 203 might be implemented using a public, private, or hybrid cloud platform, e.g., a hybrid cloud platform whose public cloud is Amazon Electric Compute Cloud (EC2) and whose private cloud is built using Cloud.com's CloudStack software. In an alternative example embodiment, server software 203 might be implemented using other public clouds and/or other private clouds that provide similar functionality. Or, server software 203 might be implemented without resort to third-party cloud platforms, e.g., using (a) OpenStack or (b) load balancing and virtualization software (e.g., Citrix XenServer, VMware, Microsoft, or Xen), distributed computing software (such as Hadoop (which implements Map-Reduce), Dremel/Apache Drill, etc.), distributed memory-caching software (such as memcached), distributed key-value database software (such as Couchbase Server nee Membase Server), NoSQL database-management software, structured database-management software (such as MySQL and NewSQL), etc. It will also be appreciated that SQL is an acronym which stands for Structured Query Language.

Returning to FIG. 2A, server software 203 includes load balancers 204 (e.g., the load balancing and virtualization software provided by Citrix, VMware, Microsoft, or Xen) that balance the load between the servers (e.g., Apache HTTP servers) in an elastic (or dynamic) array 205. It will be appreciated that the array is elastic because its size can be increased to accommodate additional servers and decreased to accommodate fewer servers. As further depicted in FIG. 2A, the servers in the elastic array 205 transmit (e.g., using HTTP) data to and receive data from (a) the web browser or app 201 and/or (b) the servers on a social networking website 202 such as Facebook. In an example embodiment, the servers might read data from and write data to memory cache 206 (e.g., a memory cache created with memcached and managed with Couchbase Server), which, in turn, is backed by database 208, which might be MySQL. In an alternative example embodiment, the database 208 might be NoSQL. It will be appreciated that performance latencies can be significantly reduced by such a caching arrangement, which exploits locality of reference. It will also be appreciated that memory cache 104*a* in FIG. 1 corresponds to the memory cache 206 in FIG. 2 and the persistent storage 105 in FIG. 1 corresponds to the database 208 in FIG. 2A. In an example embodiment, synch queue 207 might receive the data from memory cache 206 to be written asynchronously to the database 208. As indicated on FIG. 2A, the software modularization depicted in the figure might be implemented as a LAMMP (Linux, Apache, Memcache, MySQL, PHP) architecture, in an example embodiment.

Figure 2B:
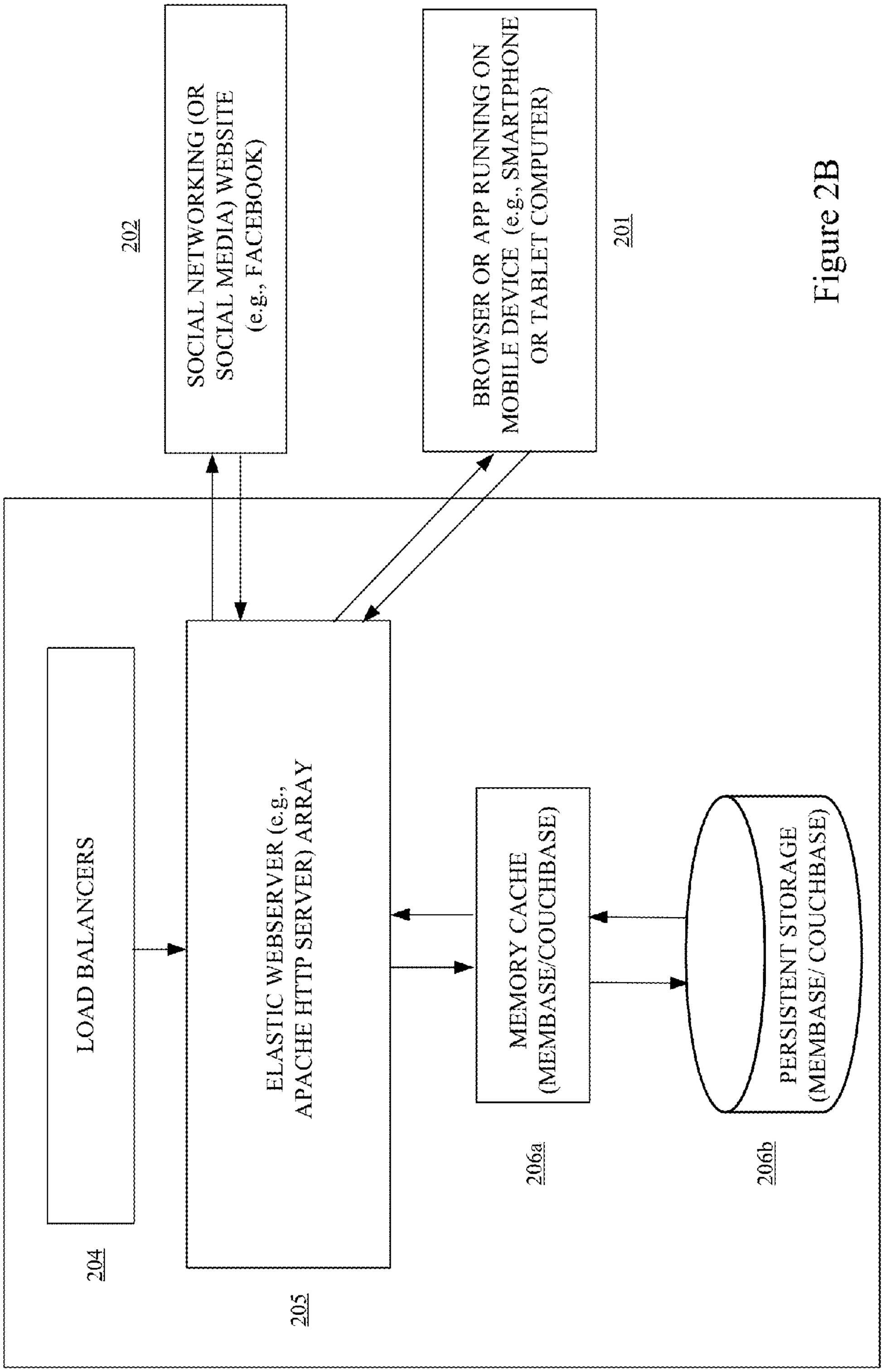
FIG. 2B is an alternative software modularization for a cloud platform, in accordance with an example embodiment.

FIG. 2B is an alternative software modularization for a cloud platform, in accordance with an example embodiment. As depicted in this figure, a player is using a web browser or app 201 on a mobile device (e.g., a smartphone or a tablet computer) to interact with server software 203 running on a website hosting an online RMG game. In an example embodiment, server software 203 might be implemented using a public, private, or hybrid cloud platform. In an alternative example embodiment, server software 203 might be implemented using other public clouds and/or other private clouds that provide similar functionality. Or, server software 203 might be implemented without resort to third-party cloud platforms, e.g., using load balancing and virtualization software, distributed computing software, distributed memory-caching software, distributed key-value database software, NoSQL database-management software, structured database-management software, etc.

In FIG. 2B, server software 203 includes load balancers 204 that balance the load between the servers in an elastic array 205. As further depicted in this figure, the servers in the elastic array 205 transmit data to and receive data from (a) the web browser or app 201 and/or (b) the servers on a social networking website 202 such as Facebook. In an example embodiment, the servers might read data from and write data to a hybrid in-memory database 206*a* and 206*b* which persists data (e.g., a hybrid in-memory database such as Membase/Couchbase Server).

Figure 3:
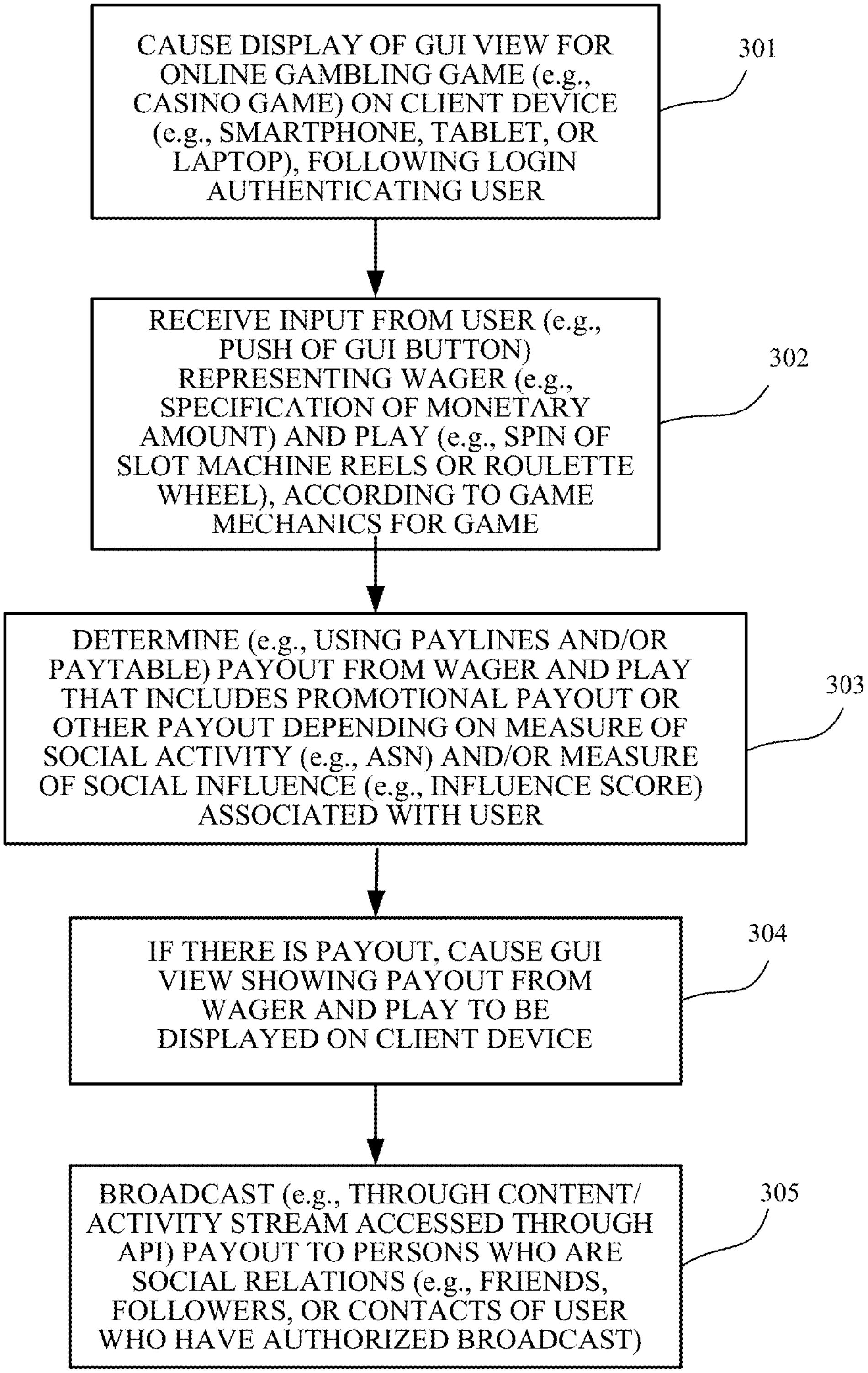
FIG. 3 is a flowchart diagram that illustrates a process for determining a payout for an online RMG game, in accordance with an example embodiment.

FIG. 3 is a flowchart diagram that illustrates a process for determining a payout for an online RMG game, in accordance with an example embodiment. In an example embodiment, one or more of the operations in this process might be performed by software (including software 203) running on servers at a website 103, e.g., a website, such as Zynga, hosting an online RMG game. In the same or an alternative embodiment, one or more of the operations in these processes might be performed by software running on personal computing device 102, e.g., (a) instructions in a webpage read by a browser supporting Adobe Shockwave/ActionScript or HTML5/CSS3/JavaScript, or (b) instructions in an app (or in a hybrid app with embedded HTML5) executing on a smartphone. It will be appreciated that ActionScript and JavaScript might be used to implement animation and/or interactivity through a browser, in example embodiments.

The process described in FIG. 3 makes use of the social relations (e.g., friends, followers, contacts, etc.) of a user, according to a contact list, buddy list, social graph, or other access control list (ACL). It will be appreciated that access to these social relations is controlled by the user. That is to say, the software performing the operations in FIG. 3 (and the other figures) will only have access to these social relations if the user authorizes such access, e.g., through a command entered on a GUI dialog displayed or caused to be displayed by the software. Similarly, in an example embodiment, the software performing the operations in FIG. 3 (and the other figures) might only have access to the profiles and/or content/activity streams of a social relation if authorized by the social relation, e.g., through a command entered on a GUI dialog displayed or caused to be displayed by software at website 103.

As depicted in FIG. 3, software (e.g., running on a server and/or client device) causes a GUI view for an online gambling game (e.g., an online casino game such as a video slot machine, video poker, video bingo, video keno, video roulette, video craps, video baccarat, video pai gow, etc.) to be displayed on client device (e.g., smartphone, tablet, or laptop), in operation 301. In example embodiments, the GUI view might be displayed by a browser or an app, following a login authenticating a user who has been previously validated to meet any governmental restrictions and/or organizational policies, e.g., with respect to age, geographical and/or jurisdictional location, problem gambling, etc. In operation 302, the software receives an input from the user (e.g., a push of GUI button) representing a wager (e.g., specification of a monetary amount) and a play (e.g., a spin of slot machine reels or a spin of a roulette wheel), according to the game mechanics for the game. In operation 303, the software determines (e.g., using a paytable) any payout from the wager and the play. In an example embodiment, the payout might include a promotional payout or other payout that depends on a measure of social activity (e.g., Active Social Network (ASN)) and/or social influence (e.g., influence score) associated with the user. If there is a payout, the software causes a GUI view showing the payout from the play and the wager to be displayed on the client device, in operation 304. Then in operation 305, the software broadcasts (e.g., through a content/activity stream on a social networking website accessed through an API) the payout to persons who are social relations (e.g., friends, followers, or contacts of the user who have authorized the broadcast).

In operation 303, the software determines any payout from the wager and the play. In an example embodiment, a payout for an online RMG game might be determined by a paytable that is a schedule of payouts for the outcomes that might occur from wagers and plays in the online RMG game. In an example embodiment, the online gambling game might be a video slot machine. It will be appreciated that a paytable for a video slot machine is a table that shows the schedule of payouts for each winning payline, depending on the amount wagered. It will further be appreciated that for a video slot machine, a winning payline might consist of multiple matching reel symbols in a horizontal, oblique, triangular, trapezoidal, zigzag, etc., line, e.g., three matching pieces of fruit (three bananas) in a horizontal line. In another example embodiment, the online gambling game might be video poker. In an example embodiment, a paytable for video poker might show the schedule of payouts for each winning hand, depending on the amount wagered.

In operation 303, the payout includes a promotional payout or other payout that depends on a measure of social activity (e.g., Active Social Network (ASN)) and/or social influence (e.g., influence or importance score) associated with the user. In an example embodiment, a promotional payout might be a supplemental payout that is not reflected in the paytable for an online RMG game, e.g., a relatively small percentage such as approximately 1-20 percent of the paytable payout. In an example embodiment, ASN might be a count of the social relations (friends, followers, contacts, etc.) of the player with whom the player has had a reciprocal (or closed) interaction loop within a duration window that is within a recency period. In an example embodiment, a reciprocal (or closed) interaction loop might involve (1) an initial message and a response message or (2) an initial message and an action in response to the message. So if the player has sent a message (e.g., (a) a message (that might include text, images, audio/video, etc.) posted to a profile maintained by social networking/media website or broadcast in an activity/content stream maintained by social networking/media website or (b) a message (that might include text, images, audio/video, etc.) pursuant to a messaging protocol such as email, instant messaging, SMS, etc.) to a friend and the friend has responded with a message within a specified duration window (e.g., one week after the initial message is sent), that friend might be included in the count, assuming the duration window is within a specified recency period (e.g., one week from the time of counting). Likewise, if the friend has sent a message to the player and the player has responded by an action such as accessing the friend's profile within a specified duration window (e.g., one week after the message is sent), that friend might be included in the count, assuming the duration window is within a specified recency period (e.g., one week from the time of counting).

In an example embodiment, the ASN count might include friends of the player who are players of the online RMG game at the online RMG website. In another example embodiment, the ASN count might include friends of the player who are players of the online RMG game at the online RMG website and friends who are players of other online games (whether RMG or not) at the online RMG website. Alternatively, the ASN count might include the friends the player on a social networking/media website, regardless of whether they are players of the online RMG game or other games at the online RMG website, e.g., friends of the player on a social networking/media website who have authorized posts (e.g., by the player and/or by the online RMG website) to their profiles or broadcasts to their content/activity streams. Likewise, in an example embodiment, the message sent to a friend or to a player might relate to the online RMG game or other online games (whether RMG or not) at the online RMG website, in order to qualify as a message for purposes of an ASN count. In an alternative example embodiment, the message sent to a friend or to a player might qualify as a message for purposes of an ASN count, regardless of the subject matter of the message. In still other example embodiments, the ASN count might be adjusted to reflect the type of message sent. For example, a reciprocal (or closed) interaction loop might be discounted (e.g., by a fraction/decimal less than 1), if the initial message is a template message broadcast by the RMG game and the message sent in response results from a click on a graphical user interface (GUI) control on the template message. And a reciprocal (or closed) interaction loop might be multiplied/amplified (e.g., by a fraction/decimal greater than 1), if the initial message and/or the message is sent in response is a personal message, e.g., a message that is not a broadcast template message. In an alternative example embodiment, ASN might be a count of friends of the player who are daily active users (DAUs) of the online RMG game or other online games (whether RMG or not) at the online RMG website within a recency period time (e.g., a week). For further description as to other example embodiments of ASN, see co-owned U.S. Published Patent Application No. 2013/0005478 by McCaffrey et al., entitled "Friend Recommendation System Based on Active Social Network", which is incorporated herein by reference.

As described above, the promotional payout or other payout might also or alternatively depend on a measure of social influence (e.g., an influence score or an importance score) associated with the user. In an example embodiment, social influence might be measured using one or a combination of centrality measures for the social network (or the social graph) associated with the user, e.g., the social relations of the user (friends, followers, contacts, etc.). Examples of such centrality measures are degree centrality, eigenvector centrality, Katz centrality, PageRank score, betweenness centrality, and closeness centrality. Other measures of social influence based on the social network (or the social graph) of the user include potential reach, clustering coefficient, core number, and vertex eccentricity, as described in Michael Wu, "Community Influencers Step by Step" (2010), which is incorporated by reference.

In operation 305, the software broadcasts the payout to persons who are social relations (e.g., friends, followers, or contacts) of the user. In an example embodiment, such broadcasting might be accomplished through the use of an application programming interface (API), which might be a web API, exposed by software running on a social networking/media website (e.g., website 106 in FIG. 1). Examples of such APIs include Facebook (REST) API, Facebook Graph API, Twitter API, Bebo's Social Networking API (SNAPI), OpenSocial API, etc. It will be appreciated that the Facebook APIs allow authorized third parties (e.g., third parties with an access token and/or permissions) to access a user's Facebook profile and the content/activity stream (e.g., Facebook News Feed) associated with that profile. Alternatively, the software might broadcast the payout to persons who are social relations using a messaging protocol such as email, instant messaging, SMS, etc.

Figure 4A:
FIGS. 4A and 4B are views in a graphical user interface (GUI) for a video slot machine, in accordance with an example embodiment.
Figure 4B:

FIGS. 4A and 4B are views in a graphical user interface (GUI) for a video slot machine, in accordance with an example embodiment. As depicted in FIG. 4A, view 401 includes four virtual reels; virtual reel 404 is the leftmost reel. The theme of the video slot machine is "Alice's Adventures in Wonderland". Consequently, the reel symbols include the March Hare, the Mad Hatter, the Caterpillar, the Queen of Hearts, the Cheshire Cat (WILD), a painted-red rose, and the Clubs Suit symbol. It will be appreciated that a wild symbol, like the Cheshire Cat, can substitute for any other symbol to achieve a winning combination. The view 401 also include a "BET" button 403 which allows the user to set the monetary amount of the wager (e.g., 1) and a "SPIN" button 404 which allows a user to initiate a play. FIG. 4B shows view 401 with a payline 405, e.g., a payline resulting from two Club Suits symbols and a Cheshire Cat (WILD) symbol next to each other in a horizontal line.

Figure 5A:
FIGS. 5A, 5B, and 5C are GUI views for a video poker game, in accordance with an example embodiment.
Figure 5B:
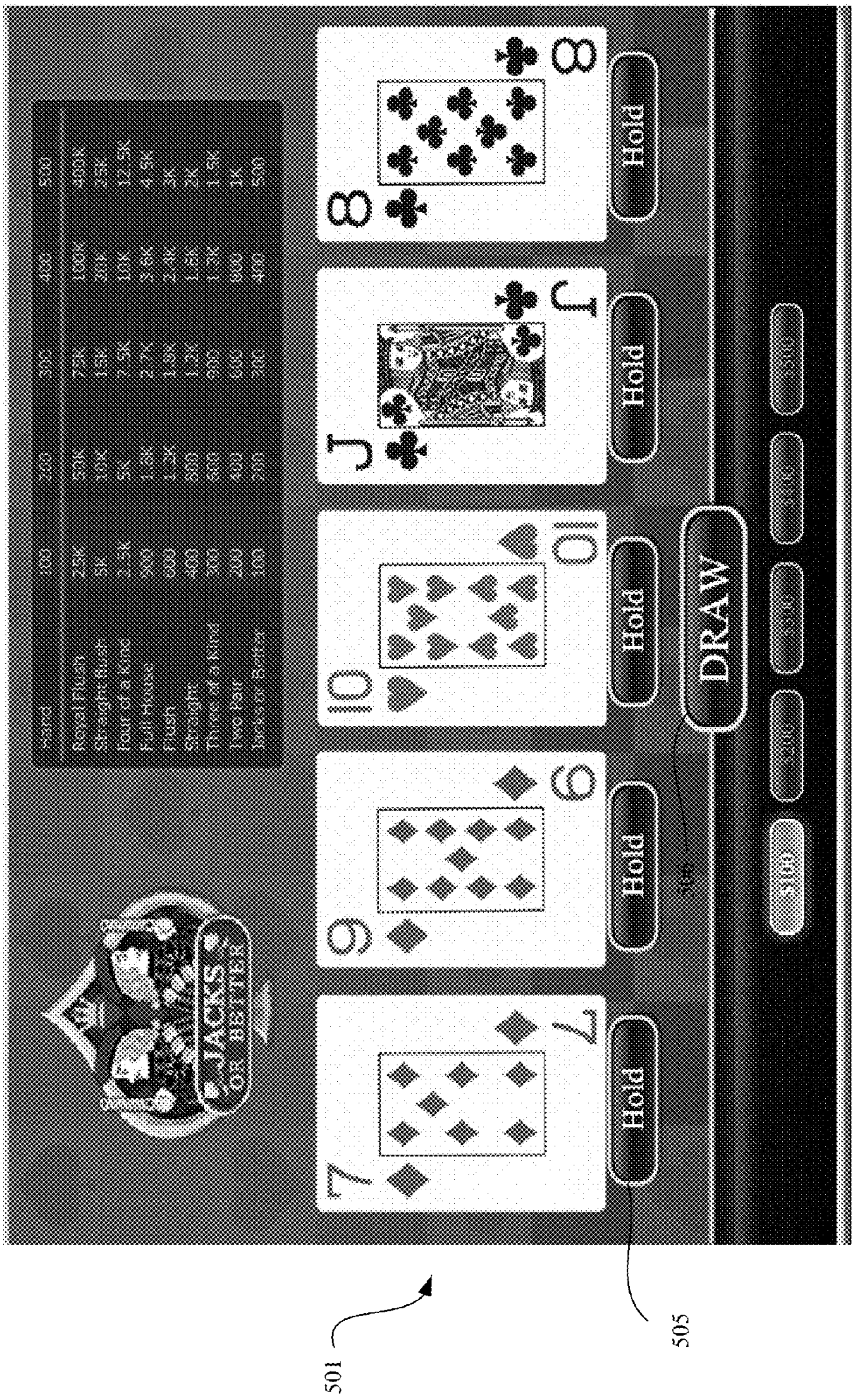
Figure 5C:

FIGS. 5A, 5B, and 5C are views in a graphical user interface (GUI) for a video poker game, in accordance with an example embodiment. As depicted in FIG. 4A, view 501 includes a hand of five face-down cards that have been dealt to a player, e.g., following a wager and play. As shown by the figure, the wager was $100, which the player specified by clicking on GUI button 503. Play was initiated by clicking on button 504, labeled "DEAL". View 501 also includes the paytable 502 for the video poker game, which shows the payout schedule for winning hands based on the monetary amount wagered. In FIG. 5B, the player has turned over the five cards in view 501 and now has an opportunity to draw a substitute card for each one of them. If the player wants to keep one of the existing cards, the player will click the GUI button labeled "Hold" below the card, such as GUI button 505. When the player clicks the GUI button 506 labeled "DRAW", the player will receive substitute cards for any cards not held. It will be appreciated that a video slot machine is a game of pure chance or nearly pure chance. It will be appreciated that video poker might be considered a game of skill, if a player is permitted to discard and draw cards. FIG. 5C shows the results of the player's decision to draw substitute cards for all five cards. As indicated by text box 507, the player has won a payout of $100 since the player's substitute cards included a pair of kings, which is better than a pair of jacks. The corresponding entry 508 in the paytable shows that the payout amount is the same monetary amount of the player's wager. To initiate another play with the same wager, the player will click again on the button labeled 504.

Figure 6:
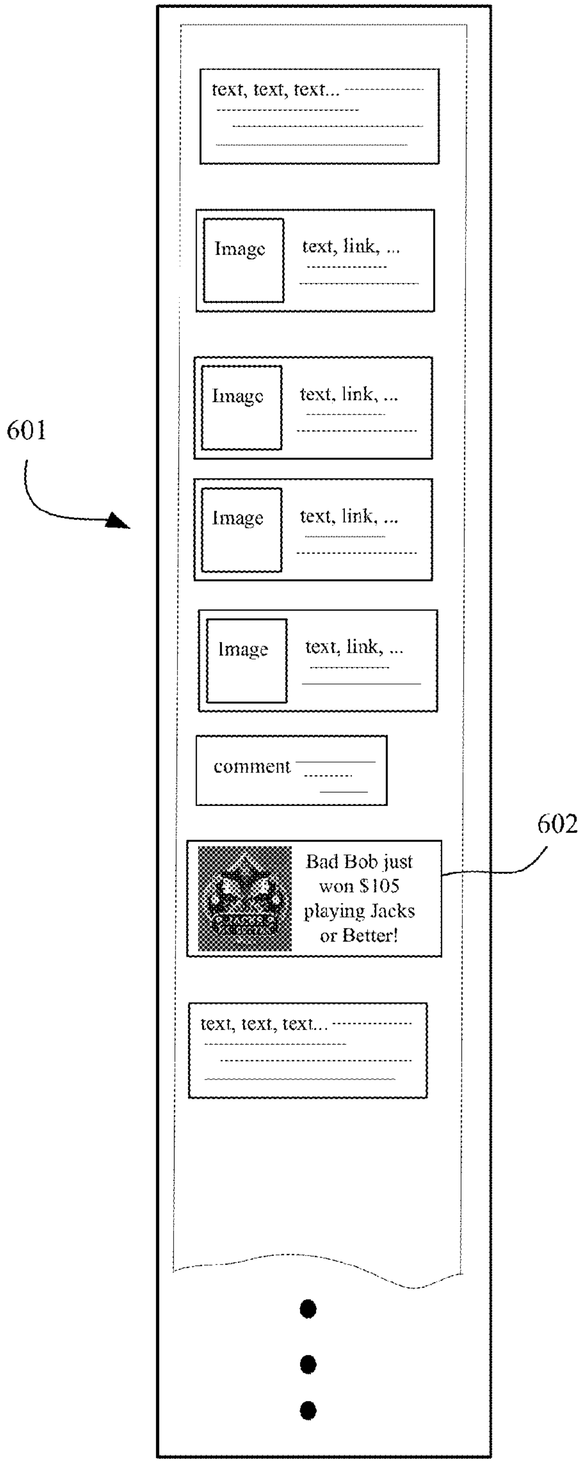
FIG. 6 is a template message broadcast to the content/activity stream, in accordance with an example embodiment.

FIG. 6 is a template message broadcast to the content/activity stream, in accordance with an example embodiment. In an example embodiment, the content/activity stream 601 might be associated with a profile of a social relation (e.g., friend, follower, or contacts) of a player of an online RMG game, e.g., the video poker game described in FIGS. 5A, 5B, and 5C. The content/activity stream and the profile might be maintained by a social networking/media website accessed through an API by the online RMG website. Or the content/activity stream and the profile might be maintained by online RMG website itself. In an example embodiment, the social relation might have previously authorized the broadcast, e.g., through a GUI dialog caused to be displayed by the online RMG website. As depicted in FIG. 6, the template message 602 broadcasts the payout of $105 awarded to "Bad Bob" as a result of playing the video poker game. It will be appreciated that such messages might stimulate interest in the video poker game, both among persons who are already playing the video poker game and persons who are not. And it will further be appreciated that the amount of stimulated interest might be related to the player's ASN or social influence.

In an example embodiment, the content of template message 602 might vary depending on the age or other attributes of the social relation. For example, if the social relation is also a player of the online game (e.g., a person whose age has been verified to meet any legal requirements), the content of the message might be as shown in template message 602. But if the social relation is not a player of the online game or is a person whose age has not been verified, the template message might broadcast: "Bad Bob has played Jacks or Better (age-requirement 21)".

Figure 7:
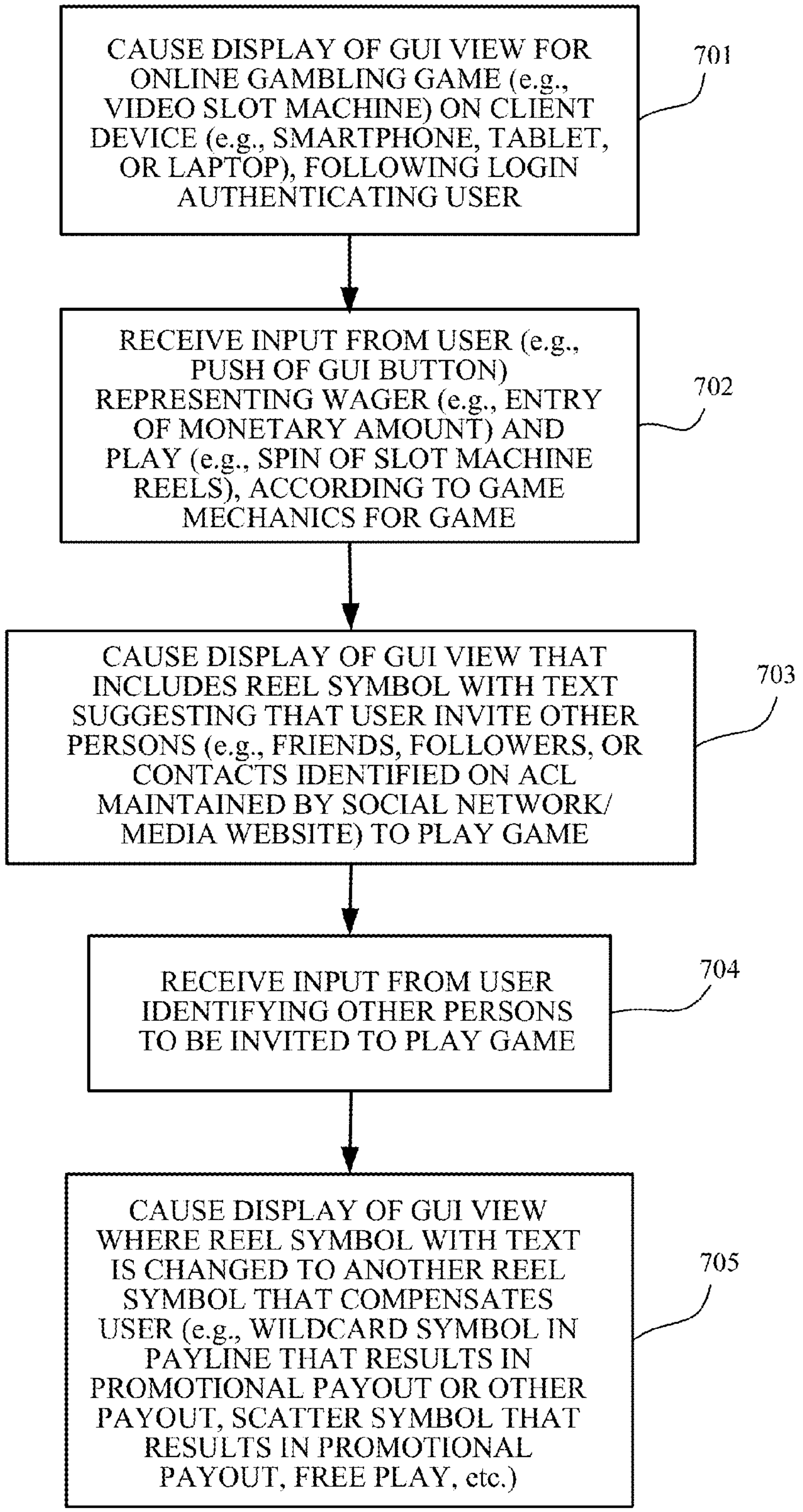
FIG. 7 is a flowchart diagram that illustrates a process for compensating a player of a video slot machine who invites other persons to play, in accordance with an example embodiment.

FIG. 7 is a flowchart diagram that illustrates a process for compensating a player of a video slot machine who invites other persons to play, in accordance with an example embodiment. In an example embodiment, one or more of the operations in this process might be performed by software (including software 203) running on servers at a website 103, e.g., a website, such as Zynga, hosting an online RMG game. In the same or an alternative embodiment, one or more of the operations in these processes might be performed by software running on personal computing device 102, e.g., (a) instructions in a webpage read by a browser supporting Adobe Shockwave/ActionScript or HTML5/CSS3/JavaScript, or (b) instructions in an app (or in a hybrid app with embedded HTML5) executing on a smartphone.

The process described in FIG. 7 makes use of the social relations (e.g., friends, followers, contacts, etc.) of a user, according to a contact list, buddy list, social graph, or other ACL. It will be appreciated that access to these social relations is controlled by the user. That is to say, the software performing the operations in FIG. 7 will only have access to these social relations if the user authorizes such access, e.g., through a GUI dialog displayed by the software.

As depicted in FIG. 7, software (e.g., running on a server and/or client device) causes a GUI view for an online gambling game (e.g., a video slot machine) to be displayed on client device (e.g., smartphone, tablet, or laptop), in operation 701. In example embodiments, the GUI view might be displayed by a browser or an app, following a login authenticating a user who has been previously validated to meet any governmental restrictions and/or organizational policies, e.g., with respect to age, geographical and/or jurisdictional location, problem gambling, etc. In operation 702, the software receives an input from the user (e.g., a push of GUI button) representing a wager (e.g., a specification of a monetary amount) and a play (e.g., a spin of slot machine reels), according to the game mechanics for the game. In operation 703, the software causes the display of a GUI view that includes a reel symbol with text suggesting that the user invite other persons (e.g., friends, followers, or contacts identified on list maintained by social network/media website) to play the game. The software receives input from the user identifying the other persons to be invited to play game, in operation 704. Then in operation 705, the software causes the display of a GUI view where the reel symbol with the text is changed to another reel symbol that compensates the user (e.g., a wildcard symbol for a payline resulting in promotional payout or other payout, a scatter symbol resulting in a promotional payout, a free play, etc.). In an example embodiment, a scatter symbol is a reel symbol that results in a payout (e.g., twice the player's wager) without being part of a payline.

Figure 8A:
FIGS. 8A, 8B, and 8C are GUI views that might be used with the process shown in FIG. 5, in accordance with an example embodiment.
Figure 8B:
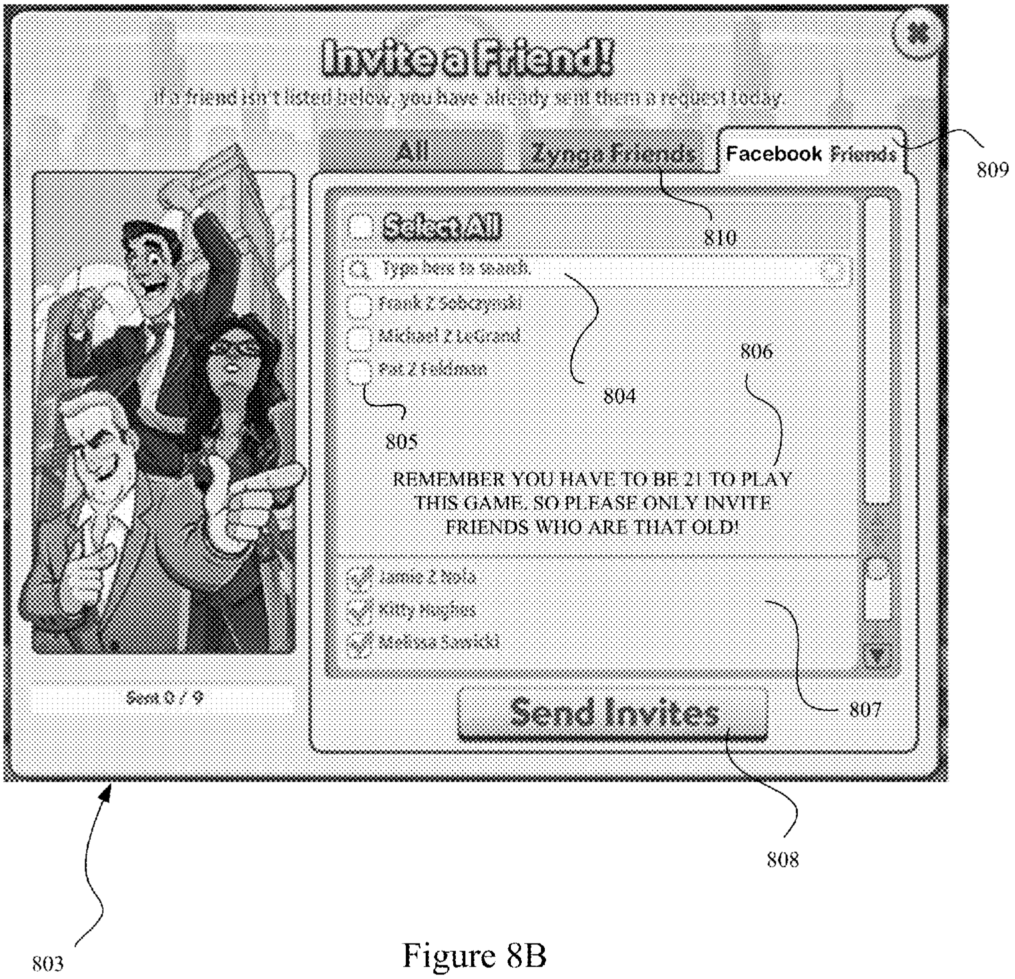
Figure 8C:

FIGS. 8A, 8B, and 8C are GUI views that might be used with the process shown in FIG. 7, in accordance with an example embodiment. As depicted in FIG. 8A, GUI view 801 for a video slot machine includes five virtual reels. The theme of the video slot machine is "Zoo Land". Consequently, the reel symbols include a toucan, a ring-tailed lemur, a koala, a tortoise, a collection of Serengeti animals including a giraffe (WILD), and a female zookeeper (SCATTER). Reel symbol 802 is a bonus symbol that suggests that the user "INVITE FRIENDS" to play the game. FIG. 8B is a GUI dialog that might be displayed when the user clicks on the reel symbol 802. GUI dialog 803 includes (a) an entry box 804 which allows the user to search for "Facebook Friends" (as indicated by tab 809) who are not already playing the game, and (b) checkboxes such as checkbox 805 which allows the user to select a Facebook Friend, who is not already playing the game, by the name of "Pat Z Feldman".

GUI dialog 803 also includes a text box 807 which lists Facebook Friends who are already playing the game and a GUI button 808 which allows the user to "SEND INVITES" to selected Facebook Friends, who presumably are twenty-one years old or older, per the language in text box 806. In an example embodiment, the software might send the invites through the use of an application programming interface (API), which might be a web API, exposed by software running on a social networking/media website (e.g., Facebook), e.g., if the invitees have authorized such invites by the player and/or by the online RMG website. It will be appreciated that the Facebook APIs allow authorized third parties (e.g., third parties with an access token and/or permissions) to access a user's Facebook profile and the content/activity stream (e.g., Facebook News Feed) associated with that profile. Alternatively, the software might send the invites using a messaging protocol such as email, instant messaging, SMS, etc. GUI dialog 803 also includes another tab 810, which allows the user to invite "Zynga Friends", rather than "Facebook Friends", where "Zynga Friends" would be friends, followers, contacts, etc., identified on a contact list, buddy list, social graph, or other access control list (ACL) maintained by Zynga, e.g., an online RMG website.

GUI view 8C shows the video slot machine, after the user has identified other persons to invite to the play the game. In view 801, bonus symbol 802 has changed into scatter symbol 811, which results in a promotional payout (e.g., twice the monetary amount of the user's wager) to the user.

In alternative example embodiments, the online RMG game might not be a video slot machine. For example, in the text inviting the user to invite other persons to play the online RMG game might appear in a square in an online bingo or keno game.

Figure 9A:
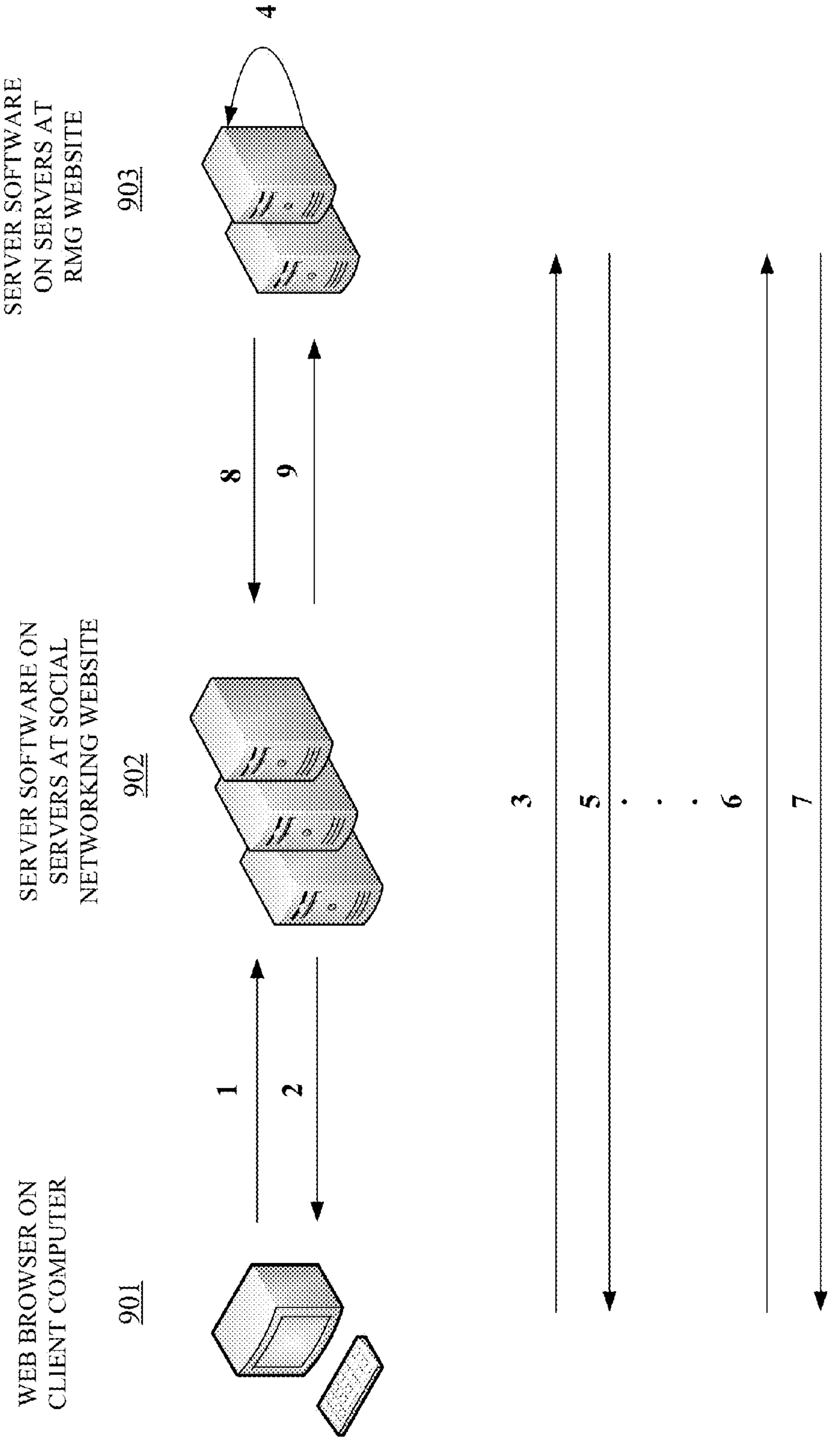
FIG. 9A is a sequence diagram that illustrates a sequence of transmissions associated with a broadcast of a payout or invitation in an online RMG game accessed from a social networking or social media website, in accordance with an example embodiment.

FIG. 9A is a sequence diagram that illustrates a sequence of transmissions associated with a broadcast of a payout or invitation in an online RMG game accessed from a social networking/media website, in accordance with an example embodiment. As depicted in this diagram, a player has used a browser 901 on a personal computing device to log onto a social networking website, e.g., server software 902 (e.g., Facebook). However, many of the transmissions described in this figure and FIG. 9B might also occur if a player using a smartphone were to run a hybrid app written in Objective C or Java that includes embedded HTML5.

In operation 1, the player clicks on a graphic for the game, causing browser 901 to transmit an HTTP request to server software 902 (e.g., Facebook) for the game's initial web page. In operation 2, server software 902 (e.g., Facebook) returns an HTML5, CSS3, and JavaScript (JS) web page consisting of an iFrame (e.g., Facebook "chrome") and an iFrame HTML tag for the game's initial web page. In operation 3, the browser uses the HTML tag to transmit a request to server software 903 (e.g., Zynga) for the game's initial web page to display inside the iFrame. The game's initial web page might be an application server page (e.g., PHP 5) or an HTML5 page. In operation 4, the application server page executes on server software 903 (e.g., Zynga), resulting in requests to databases and other servers as needed to complete generation of the web page, including possibly an HTTP request (not shown) transmitted to an API exposed by server software 902 (e.g., Facebook). In operation 5, the server software 903 (e.g. Zynga) returns the game's initial web page (e.g., HTML5, CSS3, and JS) for the browser to display in the iFrame.

At some point thereafter, in operation 6, the player clicks on a graphic (e.g., representing a graphical user interface or GUI widget) on a game web page (e.g., HTML5, CSS3, and JS), causing browser 901 to transmit an HTTP request to server software 903 (e.g., Zynga). The click might be a wager and a play resulting in a payout that is broadcast to the content/activity streams of social relations (e.g., friends, followers, or contacts) of the user who have authorized such broadcasts. Alternatively, the click might transmit a list identifying social relations to be invited to play the game, e.g., social relations who are not presently players. In operation 7, the server software 903 (e.g. Zynga) returns a web page (e.g., HTML5, CSS3, and JS) to the browser indicating that the request was received. In operation 8, the server software 903 (e.g., Zynga) transmits an HTTP request to an API exposed by server software 902 (e.g., Facebook), broadcasting the payout or invitation to play the online RMG game to the content/activity streams of the player's social relations on the social network managed by server software 902 (e.g., Facebook). It will be appreciated that in order to access the social relations' content/activity streams (e.g., using an access token), the server software 903 (e.g., Zynga) might have earlier obtained permission from the social relations, e.g., when they became players of the online RMG game or other online games at the online RMG website. Then in operation 9, server software 902 (e.g., Facebook) sends a response, e.g., in Java Script Object Notation (JSON), to server software 903 (e.g., Zynga) describing the success or failure of the broadcasting to each content/activity stream.

In an alternative example embodiment, the game's initial web page (or some subsequent web page served up by the game) might have an Adobe Flash application (e.g., a Small Web Format (SWF) file) embedded in it. In this alternative example embodiment, the user of browser 901 might thereafter interact with the Adobe Flash application (e.g., its GUI), causing it to interact with the server software 902 (e.g., Facebook) and the server software 903 (e.g., Zynga).

Figure 9B:
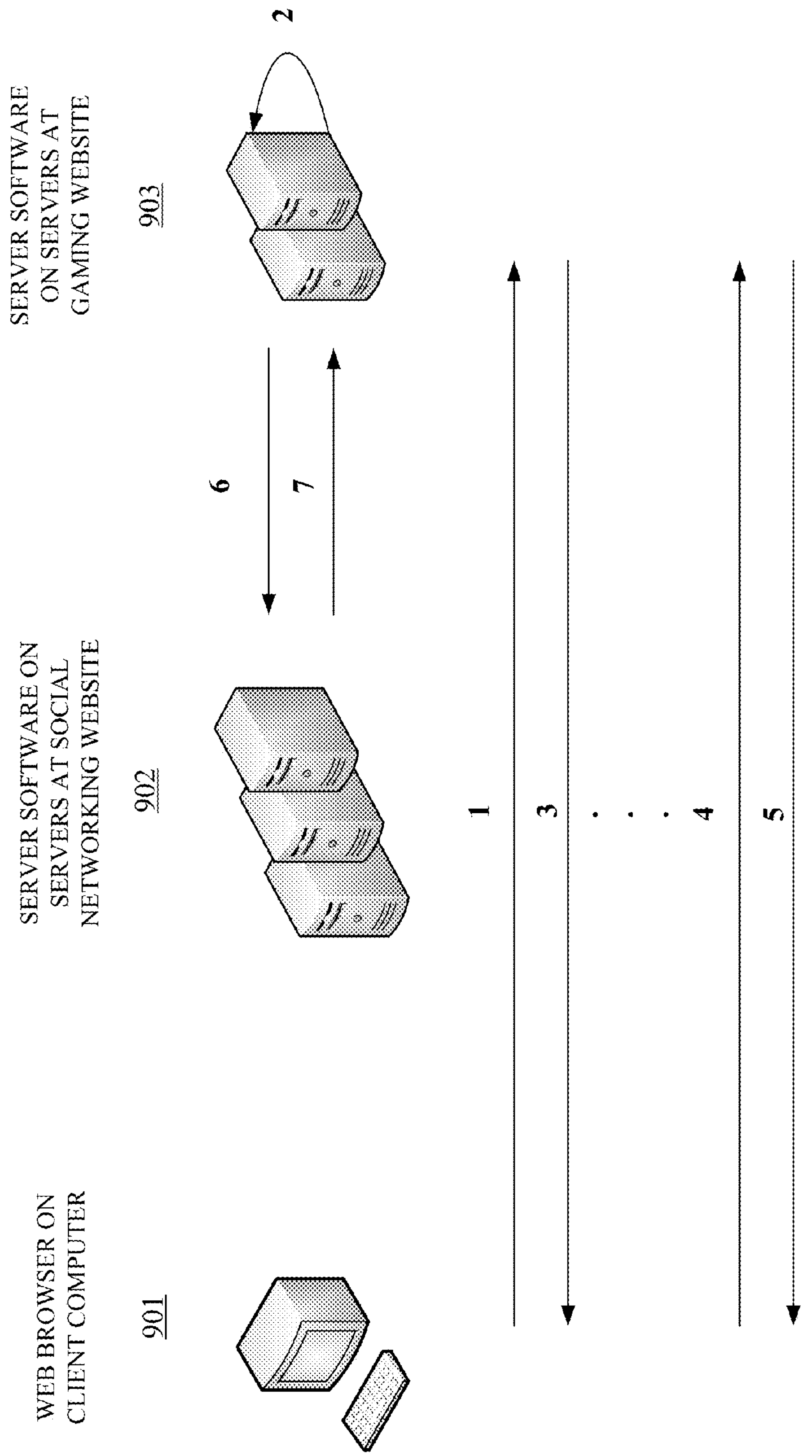
FIG. 9B is a sequence diagram that illustrates a sequence of transmissions associated with a broadcast of a payout or invitation in an online RMG game accessed from an online RMG website, in accordance with an example embodiment.

FIG. 9B is a sequence diagram that illustrates a sequence of transmissions associated with a broadcast of a payout or invitation in an online RMG game accessed from a social networking/media website, in accordance with an example embodiment. In operation 1, the player clicks on a graphic for the game, causing browser 901 to transmit an HTTP request to server software 903 (e.g., Zynga) for the game's initial web page. The game's initial web page might be an application server page (e.g., PHP 5) or an HTML5 page. In operation 2, the application server page executes on server software 903 (e.g., Zynga), resulting in requests to databases and other servers as needed to complete generation of the web page, including possibly an HTTP request (not shown) transmitted to an API exposed by server software 902 (e.g., Facebook). In operation 3, the server software 903 (e.g. Zynga) returns the game's initial web page (e.g., HTML5, CSS3, and JS) for the browser to display.

At some point thereafter, in operation 4, the player clicks on a graphic (e.g., representing a GUI widget) on a game web page (e.g., HTML5, CSS3, and JS), causing browser 901 to transmit an HTTP request to server software 903 (e.g., Zynga). The click might be a wager and a play resulting in a payout that is broadcast to the content/activity streams of social relations (e.g., friends, followers, or contacts) of the user who have authorized such broadcasts. Alternatively, the click might transmit a list identifying social relations to be invited to play the game, e.g., social relations who are not presently players. In operation 5, the server software 903 (e.g. Zynga) returns a web page (e.g., HTML5, CSS3, and JS) to the browser indicating that the request was received. In operation 6, the server software 903 (e.g., Zynga) transmits an HTTP request to an API exposed by server software 902 (e.g., Facebook), broadcasting the payout or invitation to play the online RMG game to the content/activity streams of the player's social relations on the social network managed by server software 902 (e.g., Facebook). It will be appreciated that in order to access the social relations' content/activity streams (e.g., using an access token), the server software 903 (e.g., Zynga) might have earlier obtained permission from the social relations, e.g., when they joined other Zynga games. Then in operation 7, server software 902 (e.g., Facebook) sends a response, e.g., in JSON, to server software 903 (e.g., Zynga) describing the success or failure of the broadcasting to each content/activity stream.

Here again, in an alternative example embodiment, the game's initial web page (or some subsequent web page served by the game) might have an Adobe Flash application (e.g., a Small Web Format (SWF) file) embedded in it. In this alternative example embodiment, the user of browser 901 might thereafter interact with the Adobe Flash application (e.g., its GUI), which, in turn, might interact with the server software 902 (e.g., Facebook) and the server software 903 (e.g., Zynga).

In terms of the hardware and software platforms involved in FIG. 1, the personal computing device 102 might be (a) a laptop or other personal computer or (b) a mobile device such as a smartphone, (e.g., an iPhone, Android, Blackberry, etc.) or a tablet computer (e.g., an iPad, Kindle, Nook, etc.). In an example embodiment, each of the websites 103, 106, and 108 might be composed of a number of servers connected by a network (e.g., a local area network (LAN) or a WAN) to each other in a cluster or other distributed system which might execute cloud-platform software, e.g., as described below. The servers in websites 103, 106, and 108 might also be connected (e.g., by a storage area network (SAN)) to persistent storages 105, 107, and 109, respectively. In an example embodiment, persistent storages 105, 107, and 109 might include a redundant array of independent disks (RAID).

Persistent storage 105 might be used to store algorithms and/or logic, including game mechanics, and data related to an RMG game and its players, including accounting data and data about the players received by website 103 from website 106 (e.g., through an application programming interface (API) exposed by website 106). In an example embodiment, some of the data from persistent storage 105 might be cached in memory cache 104*a* in volatile memory on servers on website 103 (e.g., using (a) an in-memory database or main memory database system (MMDB) or (b) a hybrid in-memory database that also uses persistent storage, in order to improve performance. Persistent storage 107 might be used to store data (including content) associated with a profile and/or content/activity stream for users of a social networking/media website, e.g., users who are associated with each other through ACLs. In an example embodiment, persistent storage 105 might store similar data or content. Some of the data stored in persistent storage 107 might be cached in memory cache 104*b* in volatile memory on servers at website 106, in an example embodiment. Persistent storage 109 might be used to store regulatory and/or auditing data (e.g., reports from and/or results from audits of websites such as website 103) and logic (e.g., logic that implements minimum internal control standards and/or technical or other standards).

As indicated above, personal computing device 102 might be a laptop or other personal computer. In that event, personal computing device 102 and the servers in website 103 and 106 might include (1) hardware consisting of one or more microprocessors and/or graphics processors (e.g., from the x86 family or the Power family), volatile storage (e.g., RAM), and persistent storage (e.g., a hard disk or flash memory), and (2) an operating system (e.g., Windows, Mac OS, Linux, Windows Server, Mac OS Server, etc.) that runs directly or indirectly (e.g., through virtualization software) on the hardware. Or the operating system for the servers might be replaced by a hypervisor or other virtualization software. Alternatively, personal computing device 102 might be a smartphone, tablet computer, or other mobile device that includes (1) hardware consisting of one or more low-power microprocessors and/or graphics processors (e.g., from the ARM family), volatile storage (e.g., RAM), and persistent storage (e.g., flash memory) and (2) an operating system (e.g., iOS, Android, Windows Phone, webOS, Linux, etc.) that runs on the hardware.

Also in an example embodiment, personal computing device 102 might include a web browser as an application program or part of an operating system. Examples of web browsers that might execute on personal computing device 102 if it is a laptop or other personal computer include, Internet Explorer, Mozilla Firefox, and Safari. Examples of browsers that might execute on personal computing device 102 if it is a smartphone, tablet computer, or other mobile device include Android Browser, Safari, Mozilla Firefox, and webOS Browser. It will be appreciated that users of personal computing device 102 might use browsers to communicate with software running on the servers at website 103 and at website 106. Alternatively, users of personal computing device 102 might use other application programs to communicate with software running on the servers at website 103 and at website 106. For example, if the personal computing device 102 is a smartphone, tablet computer, or other mobile device, users might use an app (e.g., an app written in Objective C or Java) or a hybrid app (e.g., an app written in Objective C or Java that includes embedded HTML5) to communicate with software running on the servers at website 103 and at website 106.

Though the disclosure above has focused on online RMG games, some or all of the operations described above might be used in a gamification application rather than in an online RMG game. It will be appreciated that gamification involves the use of game design techniques, game thinking, and game mechanics to enhance tasks performed in non-game contexts. So for example, some or all of the operations described above might be used in an employee training program.

With the above embodiments in mind, it should be understood that the inventions might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, some or all of the operations might be used with a client device that is not connected via a network to an online RMG website until some time after a wager and play have been made by a player. Rather, a wager and play might be stored on the client device and transmitted to an online RMG website at a later time, for collection of the wager and determination of any payout. Furthermore, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed:

1. A method, comprising operations, performed at a server, of:

causing a view in a graphical user interface (GUI) for a game to be displayed to a user, where the game is an online gambling game for real money;

receiving input from the user, wherein the input includes a wager and play according to game mechanics for the game;

calculating a payout from the play based on data read from and written to a memcache managed by software at the server, wherein the payout includes a promotional payout that depends at least in part on a measure of social activity associated with the user, wherein the measure of social activity depends at least in part on an active social network (ASN), wherein the ASN is a count of the social relations of the user with whom the user has had a reciprocal, closed interaction loop within a duration window that is within a recency period, as determined by data that has been read from an in-memory database and that has been received from a social networking website; and broadcasting the payout directly to at least one other person who is a social relation of the user through a corresponding content or activity stream on the social networking website accessed through an application program interface (API), wherein the at least one other person is authorized for broadcasting by the user, wherein the broadcasting is performed just after the user wins the payout, wherein each of the operations is executed by one or more processors.

2. The method of claim 1, wherein the promotional payout is a supplemental payout that is not reflected in a paytable for the game.

3. The method of claim 1, wherein a reciprocal, closed interaction loop occurs through an initial message and a response message or through an initial message and an action in response to the message.

4. The method of claim 1, wherein the promotional payout depends at least in part on a measure of influence.

5. The method of claim 4, wherein the measure of influence depends at least in part on eigenvector centrality.

6. The method of claim 4, wherein the measure of influence depends at least in part on degree centrality.

7. The method of claim 1, wherein the measure of influence depends at least in part on PageRank score.

8. The method of claim 1, wherein the activity or content stream is maintained by a social networking website.

9. The method of claim 1, wherein the social relation is associated with a list maintained by a social networking website.

10. A computer-readable storage medium persistently storing a program, wherein the program, when executed, instructs one or more processors at a server to perform operations as follows:

cause a view in a graphical user interface (GUI) for a game to be displayed to a user, where the game is an online gambling game for real money;

receive input from the user, wherein the input includes a wager and a play according to game mechanics for the game of chance;

calculate a payout from the play based on data read from and written to a memcache managed by software at the server, wherein the payout includes a promotional payout that depends at least in part on a measure of social activity associated with the user associated with the user, wherein the measure of social activity depends at least in part on an active social network (ASN), wherein the ASN is a count of the social relations of the user with whom the user has had a reciprocal, closed interaction loop within a duration window that is within a recency period, as determined by data that has been read from an in-memory database and that has been received from a social networking website; and broadcast the payout directly to at least one other person who is a social relation of the user through a corresponding content or activity stream on the social networking website accessed through an application program interface (API), wherein the at least one other person is authorized for broadcasting by the user, wherein the broadcast is performed just after the user wins the payout.

11. The computer-readable storage medium of claim 10, wherein the promotional payout is a supplemental payout that is not reflected in a paytable for the game.

12. The computer-readable storage medium of claim 10, wherein a reciprocal, closed interaction loop occurs through an initial message and a response message or through an initial message and an action in response to the message.

13. The computer-readable storage medium of claim 10, wherein the promotional payout depends at least in part on a measure of influence.

14. The computer-readable storage medium of claim 13, wherein the measure of influence depends at least in part on eigenvector centrality.

15. The computer-readable storage medium of claim 13, wherein the measure of influence depends at least in part on degree centrality.

16. The computer-readable storage medium of claim 10, wherein the measure of influence depends at least in part on PageRank score.

17. The computer-readable storage medium of claim 10, wherein the activity or content stream is maintained by a social networking website.

18. The computer-readable storage medium of claim 10, wherein the social relation is associated with a list maintained by a social networking website.

* * * * *